United States Patent
Louie et al.

(10) Patent No.: US 11,130,273 B2
(45) Date of Patent: Sep. 28, 2021

(54) COMPOSITE AUTOMATED DEBULK MACHINE FOR LARGE SCALE PARTS

(71) Applicant: THE BOEING COMPANY, Chicago, IL (US)

(72) Inventors: Michael K. Louie, Renton, WA (US); Jordan S. Erickson, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 110 days.

(21) Appl. No.: 16/502,805

(22) Filed: Jul. 3, 2019

(65) Prior Publication Data

US 2021/0001537 A1    Jan. 7, 2021

(51) Int. Cl.
  *B29C 53/56* (2006.01)
  *B29C 70/44* (2006.01)
(52) U.S. Cl.
  CPC .............. *B29C 53/56* (2013.01); *B29C 70/44* (2013.01)
(58) Field of Classification Search
  CPC ........ B29C 35/0288; B29C 2035/0822; B29C 2035/0838; B29C 70/44; B29C 70/504; B29C 2037/90; B29C 53/56; B29C 35/0805
See application file for complete search history.

(56) References Cited

U.S. PATENT DOCUMENTS

| | | | |
|---|---|---|---|
| 2,665,735 A | 1/1954 | Steffenino | |
| 7,819,651 B2 * | 10/2010 | Benson | ................. B29C 70/388 425/374 |
| 2009/0081443 A1 | 3/2009 | Benson et al. | |
| 2012/0256348 A1 | 10/2012 | Bergmann | |
| 2019/0016040 A1 | 1/2019 | Robins et al. | |

FOREIGN PATENT DOCUMENTS

| | | | | |
|---|---|---|---|---|
| KR | 101836127 B1 | 4/2018 | | |
| WO | WO-2013064187 A1 * | 5/2013 | ........... | B29C 70/388 |

OTHER PUBLICATIONS

Extended European Search Report for EP Application No. 20183671.5 dated Nov. 9, 2020.

* cited by examiner

*Primary Examiner* — Vishal I Patel
(74) *Attorney, Agent, or Firm* — Marshall, Gerstein & Borun LLP

(57) ABSTRACT

An assembly for debulking an uncured stack of plies of fiber reinforced composite material positioned on a forming tool, including a force application element and a heat source, associated with the force application element. The heat source is positioned in at least one of the following positions: spaced apart from a top ply to directionally heat the uncured stack of plies from the top ply through a bottom ply of the uncured stack of plies; with the forming tool positioned between the heat source and the uncured stack of plies, the heat source to heat the forming tool, to directionally heat the uncured stack of plies in a direction from the bottom ply through the top ply; or between the uncured stack of plies and the forming tool, to directionally heat the uncured stack of plies in the direction from the bottom ply through the top ply.

20 Claims, 10 Drawing Sheets

FIG. 10

82 — (flowchart)

84 — HEATING THE UNCURED STACK OF PLIES OF FIBER REINFORCED COMPOSITE MATERIAL, POSITIONED ON A FORMING TOOL, WITH A HEAT SOURCE, WHEREIN THE HEAT SOURCE IS POSITIONED IN AT LEAST ONE OF A FOLLOWING POSITION:

SPACED APART FROM A TOP PLY OF THE UNCURED STACK OF PLIES OF FIBER REINFORCED COMPOSITE MATERIAL TO DIRECTIONALLY HEAT THE UNCURED STACK OF PLIES OF FIBER REINFORCED COMPOSITE MATERIAL FROM THE TOP PLY, IN A DIRECTION TOWARD THE FORMING TOOL, THROUGH A BOTTOM PLY OF THE UNCURED STACK OF PLIES OF FIBER REINFORCED COMPOSITE MATERIAL;

WITH THE TOOL POSITIONED BETWEEN THE HEAT SOURCE AND THE UNCURED STACK OF PLIES OF FIBER REINFORCED COMPOSITE MATERIAL, THE HEAT SOURCE HEATS THE FORMING TOOL, WHICH DIRECTIONALLY HEATS THE UNCURED STACK OF PLIES OF THE REINFORCED FIBER COMPOSITE MATERIAL IN A DIRECTION FROM THE BOTTOM PLY THROUGH THE TOP PLY OF THE UNCURED STACK OF PLIES OF FIBER REINFORCED COMPOSITE MATERIAL;
OR

BETWEEN THE UNCURED STACK OF PLIES OF FIBER REINFORCED COMPOSITE MATERIAL AND THE TOOL, TO DIRECTIONALLY HEAT THE UNCURED STACK OF PLIES OF FIBER REINFORCED COMPOSITE MATERIAL IN THE DIRECTION FROM THE BOTTOM PLY THROUGH THE TOP PLY OF THE UNCURED STACK OF PLIES OF FIBER REINFORCED COMPOSITE MATERIAL

86 — APPLYING A FORCE WITH A FORCE APPLICATION ELEMENT, ASSOCIATED WITH THE HEAT SOURCE, ONTO THE UNCURED STACK OF PLIES OF FIBER REINFORCED COMPOSITE MATERIAL POSITIONED ON THE FORMING TOOL.

COMPOSITE AUTOMATED DEBULK MACHINE FOR LARGE SCALE PARTS

FIELD

This disclosure relates to assembling a composite laminate and more particularly to compacting the composite laminate.

BACKGROUND

Parts constructed of a composite laminate can be fabricated with laying up of two or more plies, wherein the plies include fiber reinforced composite material which are placed onto a forming tool or mandrel. A ply is constructed of reinforcement fibers which are pre-impregnated with a matrix material. The fiber can be made of any one or more of a number of materials such as fiberglass, aromatic polyamide, boron, carbon, or similar such material. The matrix material can include any one of a number of materials which include thermoset polymers such as polyester, vinyl ester, epoxy, phenolic, polyimide, polyamide, polypropylene, polyetheretherketone, or the like, as well thermoplastic polymers.

In the fabricating process of the part, the laying up of the plies includes the matrix material being in an uncured state. In one method of fabricating the plies are stacked onto a forming tool or mandrel, which functions as a mold to shape the part to be fabricated. The plies are positioned on the forming tool or mandrel by hand or by machine with application of pressure to the plies to conform the plies to the forming tool or mandrel. In fabricating a large scale part, a number of plies are stacked on the forming tool or mandrel. In stacking a number of plies, voids such as air or gas pockets can be created between plies which can result in various discontinuities in an eventually cured part such as wrinkles being formed in the fibers within the plies. Such discontinuities can create flaws in the material which may weaken the structure and reduce the quality of the part.

The standard lamination head for laying up a ply of impregnated fibers does not provide sufficient compaction pressure to the stack of plies to eliminate the voids which may form between the plies in order to prevent wrinkles. As a result, a stack of plies, such as less than the number needed for complete fabrication of the part, are removed from the laying up process. The stack of plies is placed in a vacuum bag and a vacuum is applied to consolidate and compact the stack of plies so as to remove any air or gas pockets or voids and to reduce the occurrence of fiber wrinkles in the plies.

A method is employed in the fabrication of a part constructed of composite laminate to reduce voids or trapped air or gas pockets prior to curing the part. In fabricating, for example, a large scale part, the laying up process is stopped and a debulking of a partially assembled part takes place. Typically, in the debulking process the partially assembled part is placed within a vacuum bag and a vacuum is drawn on the pre-cured plies to conform the plies to the tooling and to consolidate the plies and force trapped air or gas pockets or voids from between the plies. The partially assembled part is then returned to the laying up process. After laying up additional plies to the partially assembled part, the debulking process is employed again so as to also include the additional plies that have been applied to the partially assembled part. This debulking process is repeated until the part has been fully assembled and is ready for curing.

The process of taking the partially assembled part out of production for the debulking process which includes applying a vacuum bag, applying a vacuum and then removing the vacuum bag is a time consuming and costly process. If heat is also to be applied with the vacuum bagging process, the partially assembled part would need to be taken out of the production line location and moved to an oven location. Heating generally is not an option associated with the debulking process, with the heating step adding time and cost to production, even though heat can improve the debulking process with improvement to both material consolidation and the time needed to accomplish consolidation of the composite material.

There is a need to apply a debulking process to a stack of plies of fiber reinforced composite material which is in an uncured state without use of the time consuming application of the vacuum bagging process. In addition, there is also a need to provide a heat application to improve the material consolidation and the time to accomplish consolidation of the stack of plies without the time and cost associated with removing the part being assembled from a production line and placing the part into an oven to heat the stack of the plies.

SUMMARY

An example includes an assembly for debulking an uncured stack of plies of fiber reinforced composite material, including a force application element for application of force onto the uncured stack of plies of fiber reinforced composite material positioned on a forming tool. The assembly further including a heat source, associated with the force application element, wherein the heat source is positioned, in at least one of a following position: spaced apart from a top ply of the uncured stack of plies of fiber reinforced composite material to directionally heat the uncured stack of plies of fiber reinforced composite material from the top ply, in a direction toward the forming tool, through a bottom ply of the uncured stack of plies of fiber reinforced composite material; with the forming tool positioned between the heat source and the uncured stack of plies of fiber reinforced composite material, the heat source to heat the forming tool, to directionally heat the uncured stack of plies of the reinforced fiber composite material in a direction from the bottom ply through the top ply of the uncured stack of plies of fiber reinforced composite material; or between the uncured stack of plies of fiber reinforced composite material and the tool to directionally heat the uncured stack of plies of fiber reinforced composite material in the direction from the bottom ply through the top ply of the uncured stack of plies of fiber reinforced composite material.

An example includes a method for debulking an uncured stack of plies of fiber reinforced composite material, including the step of heating the uncured stack of plies of fiber reinforced composite material, positioned on a forming tool, with a heat source, wherein the heat source is positioned in at least one of a following position: spaced apart from a top ply of the uncured stack of plies of fiber reinforced composite material to directionally heat the uncured stack of plies of fiber reinforced composite material from the top ply, in a direction toward the forming tool, through a bottom ply of the uncured stack of plies of fiber reinforced composite material; with the forming tool positioned between the heat source and the uncured stack of plies of fiber reinforced composite material, the heat source to heat the forming tool, to directionally heat the uncured stack of plies of the reinforced fiber composite material in a direction from the bottom ply through the top ply of the uncured stack of plies of fiber reinforced composite material; or between the uncured stack of plies of fiber reinforced composite material and the forming tool to directionally heat the uncured stack of plies of fiber reinforced composite material in the direction from the bottom ply through the top ply of the uncured stack of plies of fiber reinforced composite material. The method further includes a step of applying a force with a force application element, associated with the heat source, onto the uncured stack of plies of fiber reinforced composite material positioned on a forming tool.

The features, functions, and advantages that have been discussed can be achieved independently in various examples or may be combined in yet other examples further details of which can be seen with reference to the following description and drawings.

BRIEF SUMMARY OF THE DRAWINGS

FIG. 10 is a flow chart of a method for debulking a stack of plies of fiber reinforced composite material.

DESCRIPTION

Figure 1:
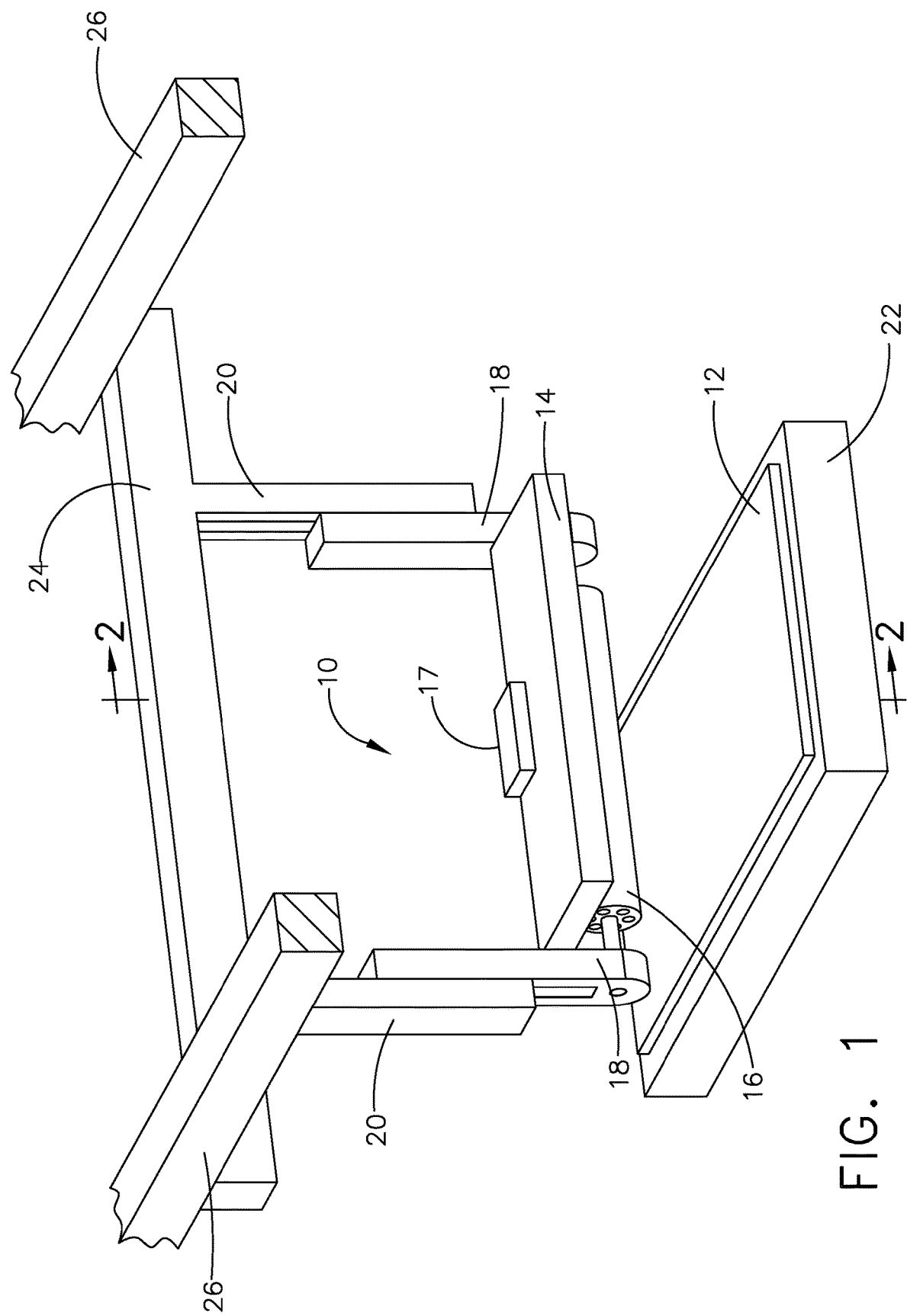
FIG. 1 is a perspective view of a debulking assembly for applying a compaction force and applying heat directionally through a stack of plies of fiber reinforced composite material supported by a forming tool.

In referring to FIG. 1, assembly 10 for debulking uncured stack of plies of fiber reinforced composite material 12 or uncured composite laminate is shown positioned in a composite laminate laying up production line with an uncured stack of plies of fiber reinforced composite material 12 positioned on forming tool 22. With the laying up of uncured stack of fiber reinforced composite material 12 onto forming tool 22 in production of a composite laminate part as seen in FIG. 1, voids and/or air or gas pockets can be trapped between plies in the composite laminate. Assembly 10 for debulking uncured stack of plies of fiber reinforced composite material 12 can be employed on the uncured stack of plies of fiber reinforced composite material 12 to debulk the uncured stack of plies of fiber reinforced composite material 12 to compact and consolidate so as to remove the voids and/or air or gas pockets from between the plies of the composite laminate. The removal of the voids and/or air or gas pockets prevents the occurrence of wrinkling of fibers within the plies at the time of curing the composite laminate resulting in the production of a quality composite laminate part.

In debulking of uncured stack of plies of fiber reinforced composite material 12, heat source 14 is activated to heat uncured stack of plies of fiber reinforced composite material 12. In this example, the laying up of uncured stack of plies of fiber reinforced composite material 12 constructed, in this example, of carbon fiber reinforced polymer takes place at an ambient temperature in this example of approximately seventy degrees Fahrenheit (70° F.). Heat source 14 will in this example heat uncured stack of plies of fiber reinforced composite material 12 to approximately one hundred and twenty degrees Fahrenheit (120° F.) to approximately one hundred and forty degrees Fahrenheit (140° F.). The heating of the uncured stack of plies of fiber reinforced composite material 12 lessens the viscosity of the resin and facilitates compaction and the time to compact uncured stack of plies of fiber reinforced composite material 12 with the application of force from force application element 16. Different examples of heat source 14 will be discussed herein which apply heat directionally through uncured stack of plies of fiber reinforced composite material 12, which is supported on forming tool 22.

The temperature of uncured stack of plies of fiber reinforced composite material 12 is sensed with heat sensor 17 positioned to sense heat from the uncured stack of plies of fiber reinforced composite material 12 positioned on the forming tool 22. Heat sensor 17 determines the temperature of the uncured stack of plies of fiber reinforced composite material 12. With the temperature reaching, a desired temperature, the application of force from force application element 16 can be applied compacting and consolidating uncured stack of plies of fiber reinforced composite material 12 removing voids and/or air or gas pockets between plies prior to application of curing of the uncured stack of plies of fiber reinforced composite material 12 so as to avoid fiber wrinkling in the plies of uncured stack of plies of fiber reinforced composite material 12. Heat sensor 17 can be any one of a variety of heat sensing devices such as for example, a camera, a pyrometer, an infrared sensor and the like. In an automated device, a sensor programmable control can be associated with heat sensor 17 such that with sensing the temperature of the uncured stack of plies of fiber reinforced composite material 12 and the sensor programmable control can control heat source 14 as needed for optimally operating assembly 10 for debulking.

Force application element 16 is mounted to support frame 18 and will be discussed in more detail herein for different examples of force application elements. In addition, in this example, heat source 14 and heat sensor 17 are secured to support frame 18 as well. As seen in FIG. 1, support frame 18 is mounted to second support frame 20 such that support frame 18 can be moved along second support frame 20, such as for example with a force element such as a spring or hydraulic apparatus (not shown) positioned within second support frame 20 so as to exert a desired force onto support frame 18 and in turn onto force application element 16, which applies compaction and consolidation force onto uncured stack of plies of fiber reinforced composite material 12.

Force application element 16 in turn exerts the force received from support frame 18, in this example, onto uncured stack of plies of fiber reinforced composite material 12 positioned on forming tool 22. The force applied, in this example ranges from thirty to fifty pounds per square inch (30-50 psi), onto uncured stack of plies of fiber reinforced composite material 12 positioned on forming tool 22. Second support frame 20 is secured, in this example, to suspension beam 24, which is secured to rails 26 positioned on opposing ends of suspension beam 24 so as to permit suspension beam 24 to slide along rails 26 and permit force application element 16 to move along uncured stack of plies of fiber reinforced composite 12 as needed for compaction and consolidation of uncured stack of plies of fiber reinforced composite material 12.

Figure 2:
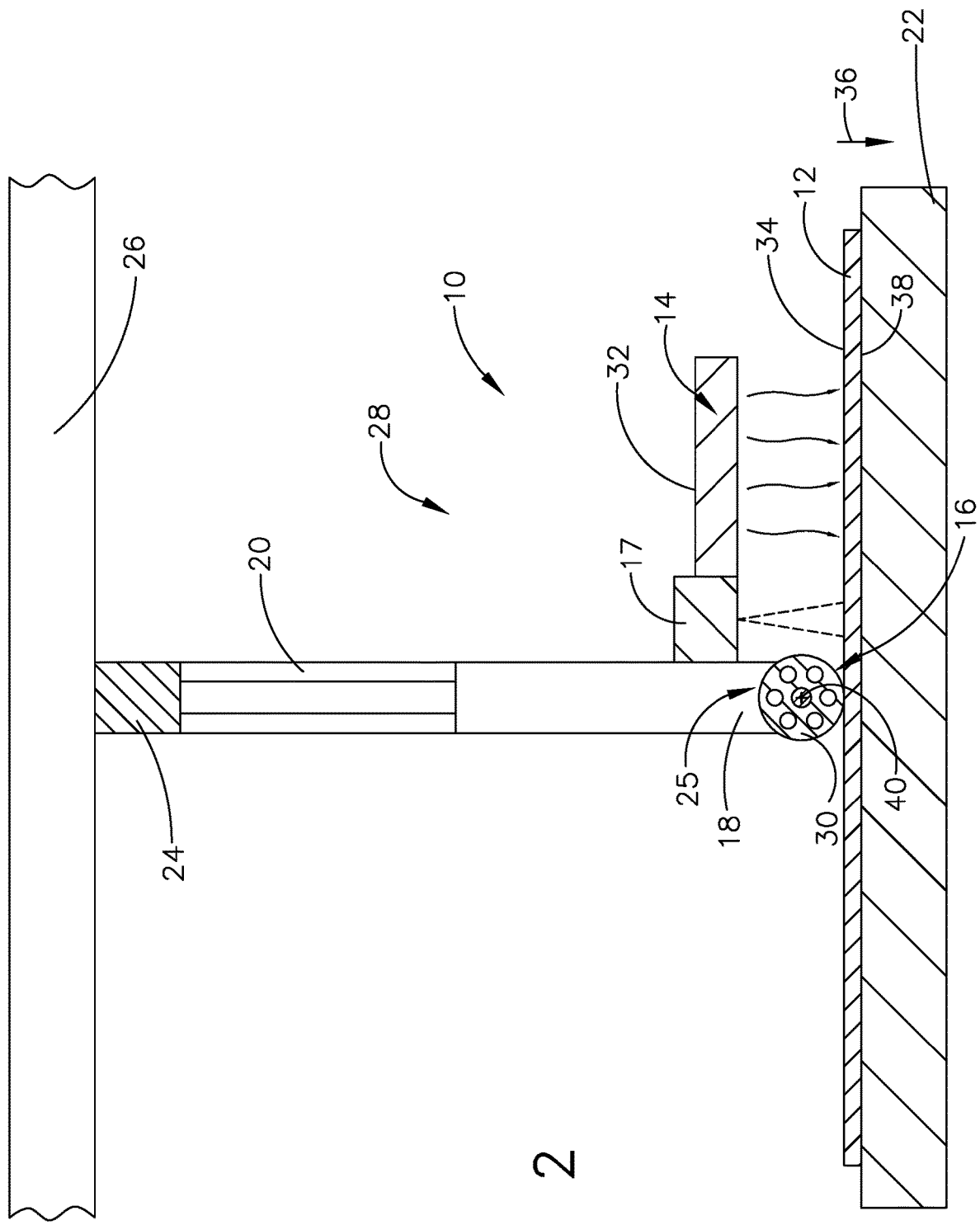
FIG. 2 is a cross section side elevation view along line 2-2 of FIG. 1 of a first example of the debulking assembly in operation, with a first example of a force application element and a first example of a heat source for directionally heating the stack of plies through a top ply.

In referring to FIG. 2, first example 28 of assembly 10 for debulking is shown, in operation with first example 25 of force application element 16 being roller 30 along with first example 32 of heat source 14 being a radiant source such as, for example, a xenon flash lamp or a laser diode or other radiant heat sources such as electrical coils for heating uncured stack of plies of fiber reinforced composite material 12. First example 32 of heat source 14 in first example 28 of assembly 10 for debulking is positioned spaced apart from top ply 34 of the uncured stack of plies of fiber reinforced composite material 12 to directionally heat the uncured stack of plies of fiber reinforced composite material 12 from top ply 34, in direction 36 toward forming tool 22, through bottom ply 38 of the uncured stack of plies of fiber reinforced composite material 12. In first example 28 of assembly 10 for debulking in FIG. 2, first example 32 of heat source 14 is spaced apart from first example 25 of force application element 16 such as roller 30. With first example 32 of heat source 14 positioned spaced apart from roller 30, heating of uncured stack of plies of fiber reinforced composite material 12 can be applied in advance of the first example 25 of force application element 16 or roller 30 imparting a force, received from the above described force element such as a spring or hydraulic apparatus (not shown) positioned within second support frame 20, against uncured stack of plies of fiber reinforced composite material 12 to facilitate compaction and consolidation of uncured stack of plies of fiber reinforced composite material 12.

Figure 4:
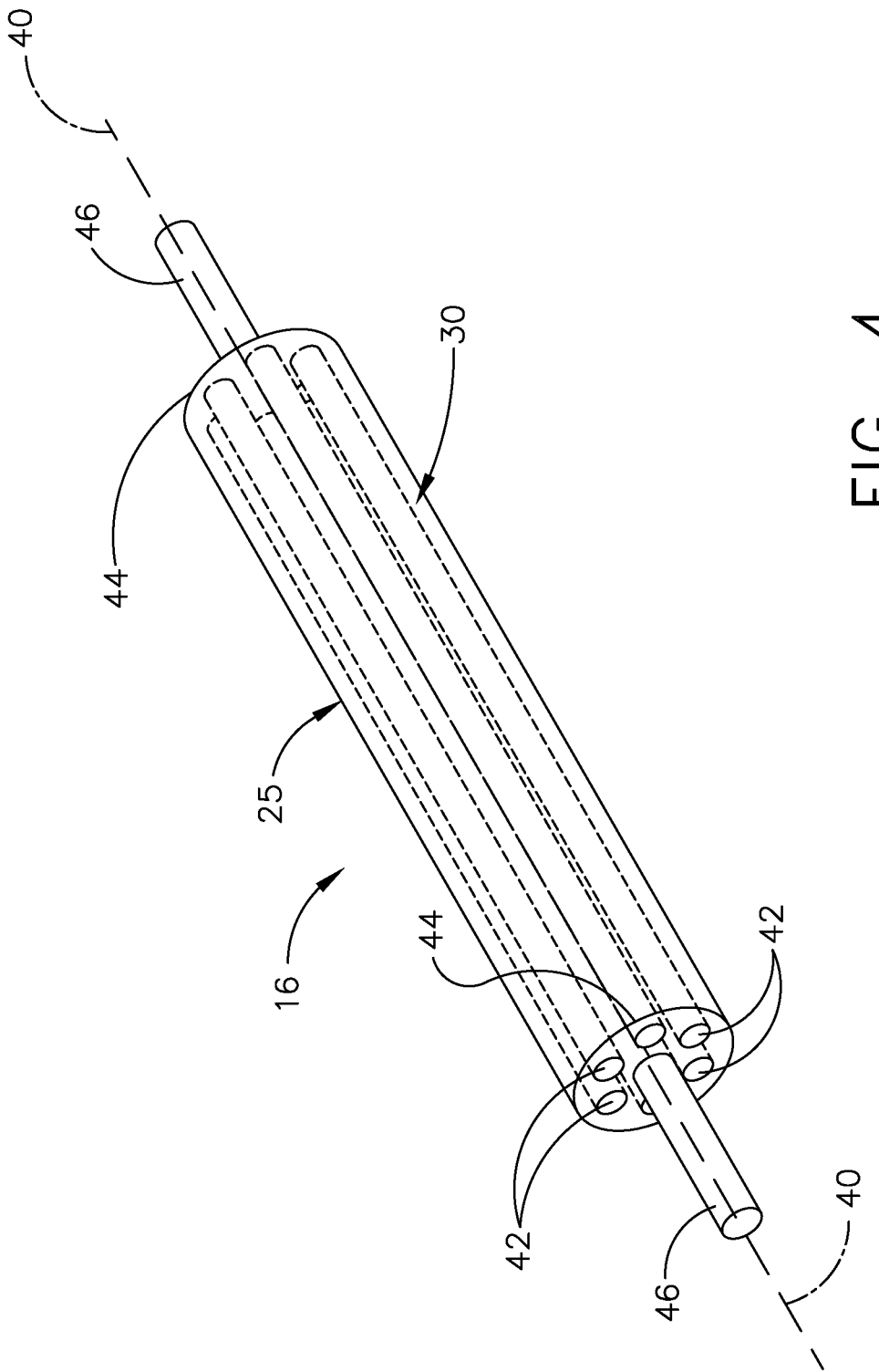
FIG. 4 is a perspective view of the first example of the force application element as seen in FIGS. 2 and 3.

First example 25 of force application element 16 is shown as roller 30 in FIG. 2, as mentioned above. Roller 30 has longitudinal axis 40 as seen in FIGS. 2 and 4. Roller 30 defines at least two openings 42, which extend along longitudinal axis 40 of roller 30. At least two openings 42 are positioned between longitudinal axis 40 and surface 44 of roller 30 and are positioned spaced apart from one another about longitudinal axis 40. Roller 30 further includes shaft 46 secured to roller 30 wherein shaft 46 extends along longitudinal axis 40 of the roller 30. Roller 30 is rotatably mounted to shaft 46 such as with bearings (not shown) which permits roller 30 to rotate relative to shaft 46 such that with a force applied to shaft 46 urging roller 30 against uncured stack of plies of fiber reinforced composite material 12 as seen in FIG. 2 and suspension beam 24 moves along rails 26 roller 30 rotates about shaft 46 applying a compaction force against uncured stack of plies of fiber reinforced composite material 12. With roller 30 constructed of rubber or of various elastomeric materials and with at least two openings 42 positioned through roller 30, surface 44 of roller 30 provides roller 30 conforming capability to uncured stack of plies of fiber reinforced composite material 12 positioned on forming tool 22. Uncured stack of plies of fiber reinforced composite material 12 can have a relatively flat planar formation or can include varying contours. The conforming capability of roller 30 provides roller 30 the ability to exert a compaction and consolidating force across the uncured stack of plies of fiber reinforced composite material 12 in the presence of changing contours of the uncured stack of plies of fiber reinforced composite material 12.

Figure 3:
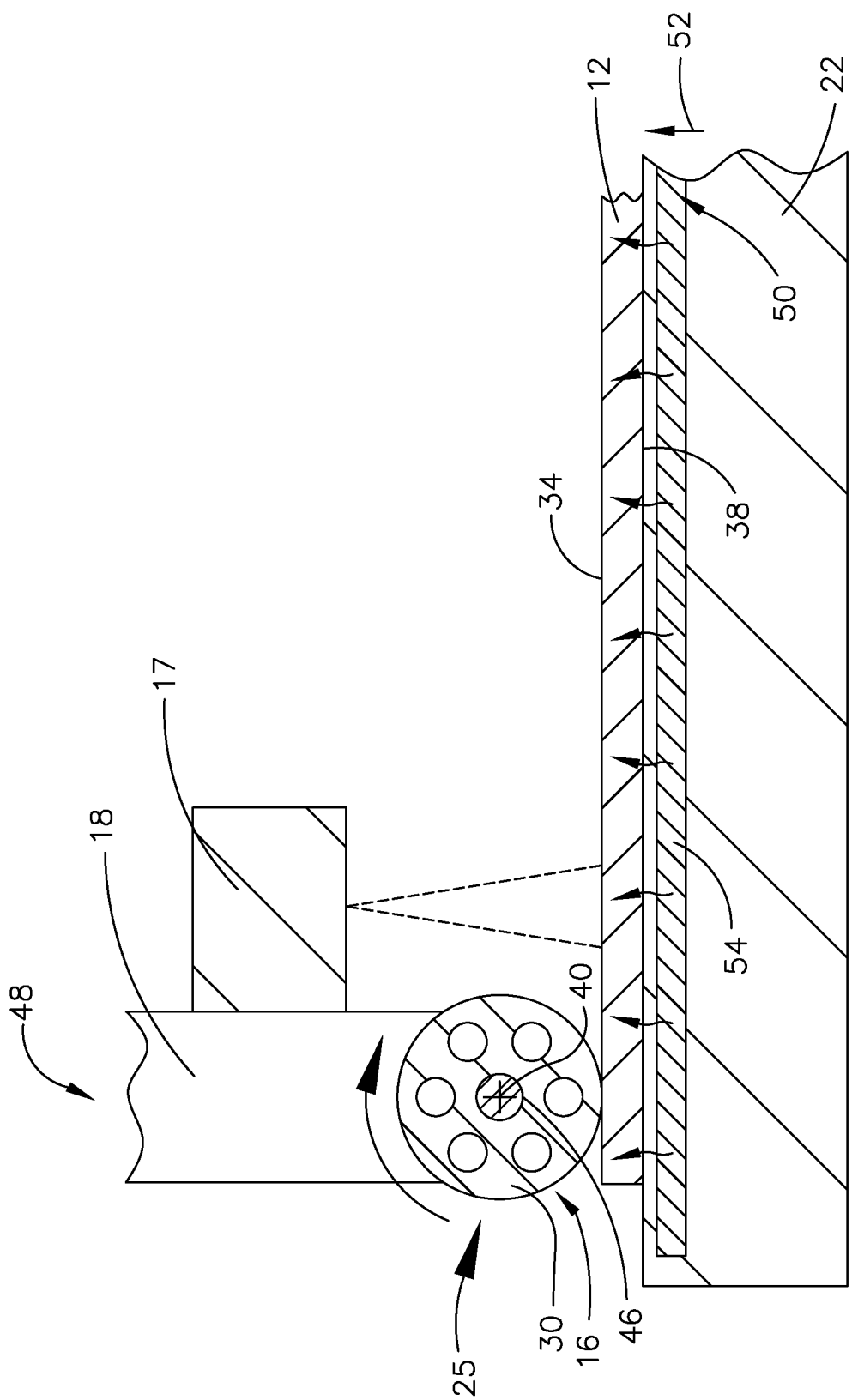
FIG. 3 is a cross section side elevation view along line 2-2 of FIG. 1 of a second example of the debulking assembly in operation, utilizing the first example of the force application element of FIG. 2 and utilizing a second example of a heat source for directionally heating the stack of plies through the forming tool and through a bottom ply.

In referring to FIG. 3 second example 48 of assembly 10 for debulking is shown in operation with first example 25 of force application element 16 being roller 30, as described above, and with a second example 50 of heat source 14 for directionally heating uncured stack of plies of fiber reinforced composite material 12. With forming tool 22 positioned between second example 50 of heat source 14 and uncured stack of plies of fiber reinforced composite material 12, the second example 50 of heat source 14 heats forming tool 22, which directionally heats uncured stack of plies of fiber reinforced composite material 12 in direction 52 from bottom ply 38, through top ply 34 of uncured stack of plies of fiber reinforced composite material 12. Second example 50 of heating source 14 in this example includes piping 54 containing a heated liquid or gas, which in this example, piping 54 is in contact with forming tool 22. Other examples of second example 50 can include a vessel in which a heated liquid or gas can be contained (not shown) associated with the forming tool 22 which is associated or in particular secured to the forming tool 22, a heating element (not shown) associated with or more particularly secured to forming tool 22 or electrical heating coils secured to forming tool 22 or the like. The heating of the uncured stack of plies of fiber reinforced composite material 12 through forming tool 22 facilitates, as mentioned earlier, the compaction and consolidation with application of first example 25 of force application element 16 being roller 30 as well as facilitates the shortening in time in which to achieve the compaction and consolidation. The compaction and consolidation avoids wrinkling of fibers within the plies with the curing of the uncured stack of plies of the fiber reinforced composite material 12.

Figure 5:
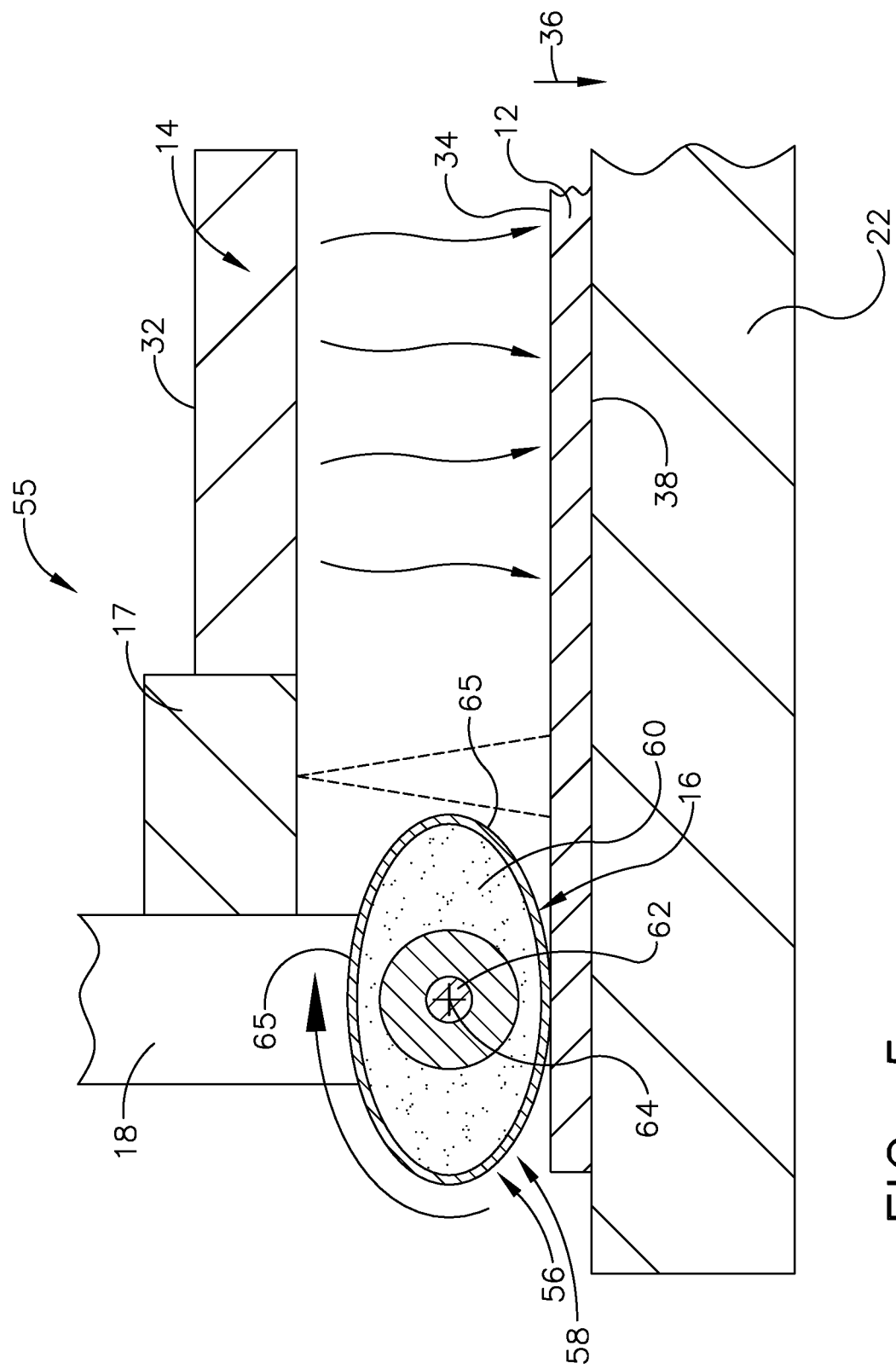
FIG. 5 is a cross section side elevation view along line 2-2 of FIG. 1 of a third example of the debulking assembly in operation utilizing a second example of a force application element and utilizing the first example of the heat source for directionally heating the stack of plies through the top ply of FIG. 2.
Figure 7:
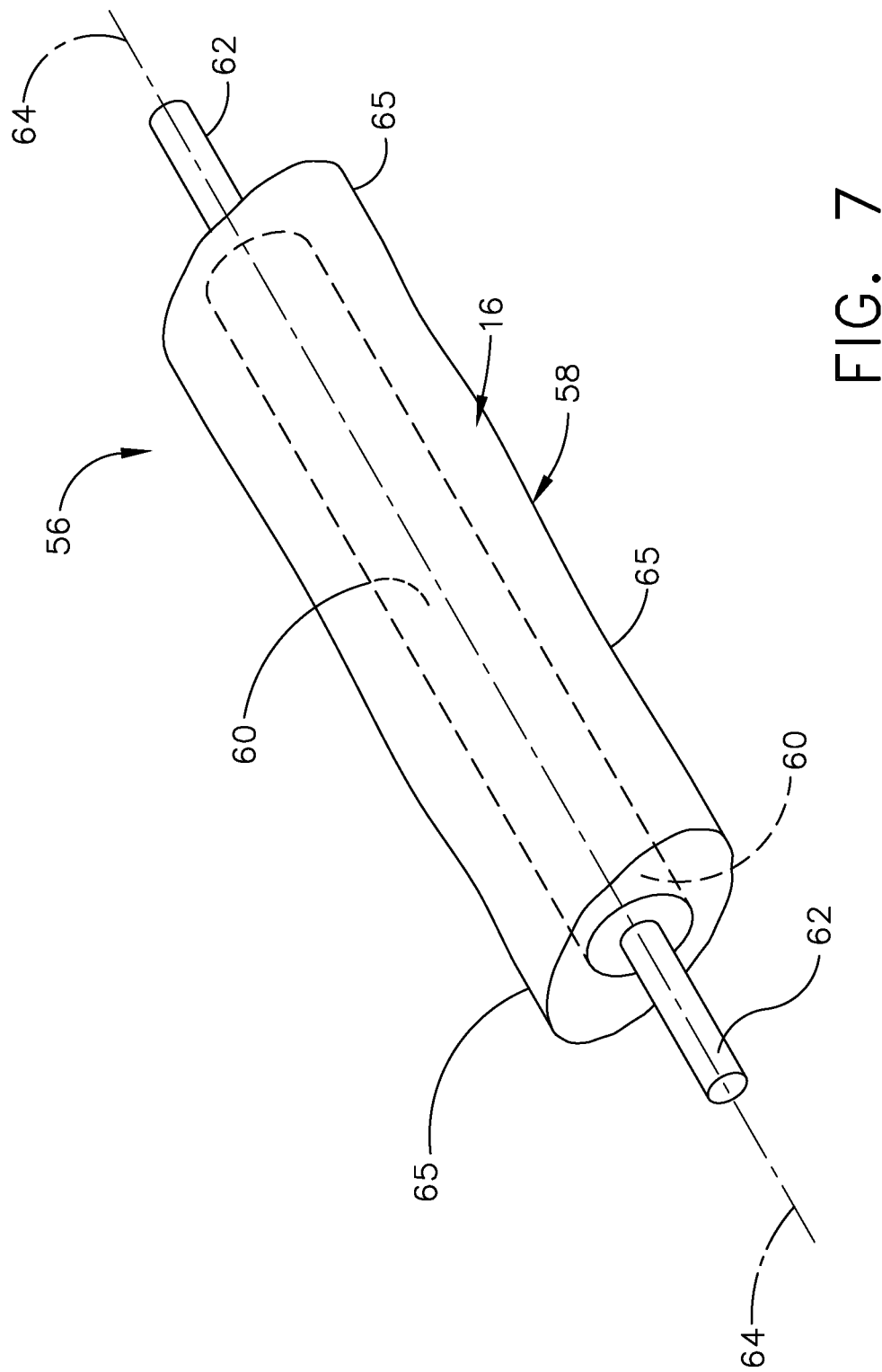
FIG. 7 is a perspective view of the second example of the force application element as seen in FIGS. 5 and 6.

In referring to FIG. 5, third example 55 of assembly 10 for debulking is shown in operation, as similarly shown in first example 28 of assembly 10 for debulking shown in FIG. 2, except instead of employing first example 25 of force application element 16 being roller 30 as seen in FIG. 2, a second example 56 of force application element 16 being rotatable bladder 58 is employed. As seen in FIGS. 5 and 7, rotatable bladder 58 further includes roller member 60 which extends through rotatable bladder 58 and is secured to rotatable bladder 58. In this example, rotatable bladder 58 is bonded with an adhesive to roller member 60. Shaft 62 is secured to roller member 60 wherein shaft 62 extends along longitudinal axis 64 of roller member 60. As rotatable bladder 58 rotates along uncured stack of plies of fiber reinforced composite material 12, roller member 60 and shaft 62 rotate with rotatable bladder 58. Shaft 62 is rotatably mounted to support frame 18 with a ball bearing engagement (not shown) which permits shaft 62 to rotate relative to support member 18 as support frame 18, second support frame 20 and suspension beam 24, in this example, move along rails 26 as seen in FIG. 2. As mentioned above, support frame 18 is mounted to second support frame 20 such that support frame 18, as seen in FIG. 1, can be moved along second support frame 20, such as for example with a spring or hydraulic element (not shown) positioned within second support frame 20 so as to exert a desired force onto support frame 18 and in turn onto force application element 16 and in this example, rotatable bladder 58. Force application element 16 or rotatable bladder 58, in turn, exerts the force onto uncured stack of plies of fiber reinforced composite material 12 positioned on forming tool 22. The applied force compacts and consolidates uncured stack of plies of fiber reinforced composite material 12 and removes voids and/or air or gas pockets between plies in the uncured stack of plies of fiber reinforced composite material 12. The removal of the voids and/or air or gas pockets avoids the occurrence of fiber wrinkling within the plies upon curing of the uncured stack of plies of fiber reinforced composite material 12.

With rotatable bladder 58 being constructed of an elastomeric material and filled with a gas or liquid, surface 65 provides conforming capability to uncured stack of plies of fiber reinforced composite material 12 positioned on forming tool 22. Varying the rotatable bladder 58 pressure is available to the operator to change the conformability of the rotatable bladder 58 to uncured stack of plies of fiber reinforced composite material 12. Uncured stack of plies of fiber reinforced composite material 12 can have a relatively flat planar formation or include varying contours. In an instance of an increased presence of changing contour of the uncured stack of plies of fiber reinforced composite material 12, the pressure within rotatable bladder 58 can be lowered to allow for a more conformable rotatable bladder 58 for exerting a more consistent compaction and consolidation force on and through uncured stack of plies of fiber reinforced composite material 12. In an instance of a decreased changing contour or flatter configuration of uncured stack of plies of fiber reinforced composite material 12, the pressure within rotatable bladder 58 can be increased so as to have a lesser conformability with applying compaction and consolidation force to uncured stack of plies of fiber reinforced composite material 12 in the application of a consistent compaction and consolidation force on and through uncured stack of plies of fiber reinforced composite material 12.

In further referring to FIG. 5, first example 32 of heat source 14 is employed being a radiant source such as for example a xenon flash lamp or a laser diode or radiant heat sources such as electrical coils for heating uncured stack of plies of fiber reinforced composite material 12, as discussed above with respect to first example 28 of assembly 10 for debulking in FIG. 2. First example 32 of heat source 14 in first example 28 is positioned spaced apart from top ply 34 of the uncured stack of plies of fiber reinforced composite material 12 to directionally heat the uncured stack of plies of fiber reinforced composite material 12 from top ply 34, in direction 36 toward forming tool 22, through bottom ply 38 of the uncured stack of plies of fiber reinforced composite material 12. First example 32 of heat source 14 is spaced apart from force application element 16 such as rotatable bladder 58 for heating uncured stack of plies of fiber reinforced composite material 12 in advance of the rotatable bladder 58 imparting a compaction force against uncured stack of plies of fiber reinforced composite material 12 to facilitate compaction and remove voids as well as gas and air pockets.

Figure 6:
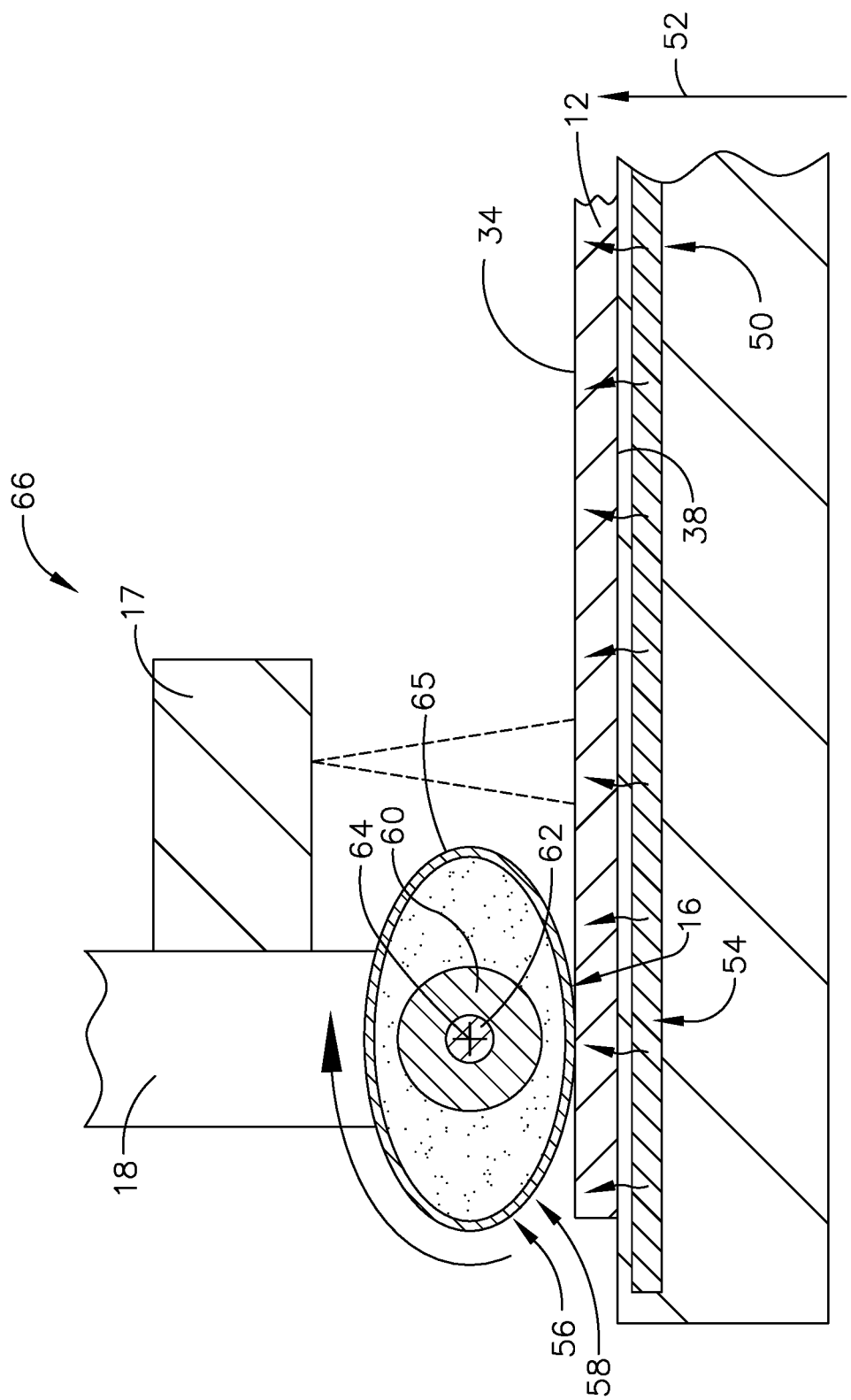
FIG. 6 is a cross section side elevation view along line 2-2 of FIG. 1 of a fourth example of the debulking assembly in operation utilizing the second example of the force application element of FIG. 5 and the second example of the heat source for directionally heating the stack of plies through the forming tool and through a bottom ply.

In referring to FIG. 6, fourth example of assembly 10 for debulking is shown, in operation with second example 56 of force application element 16 being rotatable bladder 58 as described above with respect to FIG. 5 along with second example 50 of heat source 14 for directionally heating uncured stack of plies of fiber reinforced composite material 12, as described above with respect to FIG. 3. With forming tool 22 positioned between second example 50 of heat source 14 and uncured stack of plies of fiber reinforced composite material 12, second example 50 of heat source 14 heats forming tool 22, which directionally heats uncured stack of plies of fiber reinforced composite material 12 in direction 52 from the bottom ply 38 through top ply 34 of uncured stack of plies of fiber reinforced composite material 12. Second example 50 of heating source 14 in this example includes piping 54 containing a heated liquid or gas, which in this example, piping 54 is in contact with forming tool 22. Other examples of second example 50, as mentioned earlier, can include vessels in which a heated liquid or gas can be contained (not shown), heating pads (not shown) secured to forming tool 22 or electrical heating coils secured to forming tool 22 or the like. The heating of the uncured stack of plies of fiber reinforced composite material 12 through forming tool 22 facilitates the compaction and consolidation with application of rotatable bladder 58 as well as shortens the time in which to achieve the compaction and consolidation to avoid wrinkling of fibers within the plies with the curing of the uncured stack of plies of the fiber reinforced composite material 12.

Figure 8:
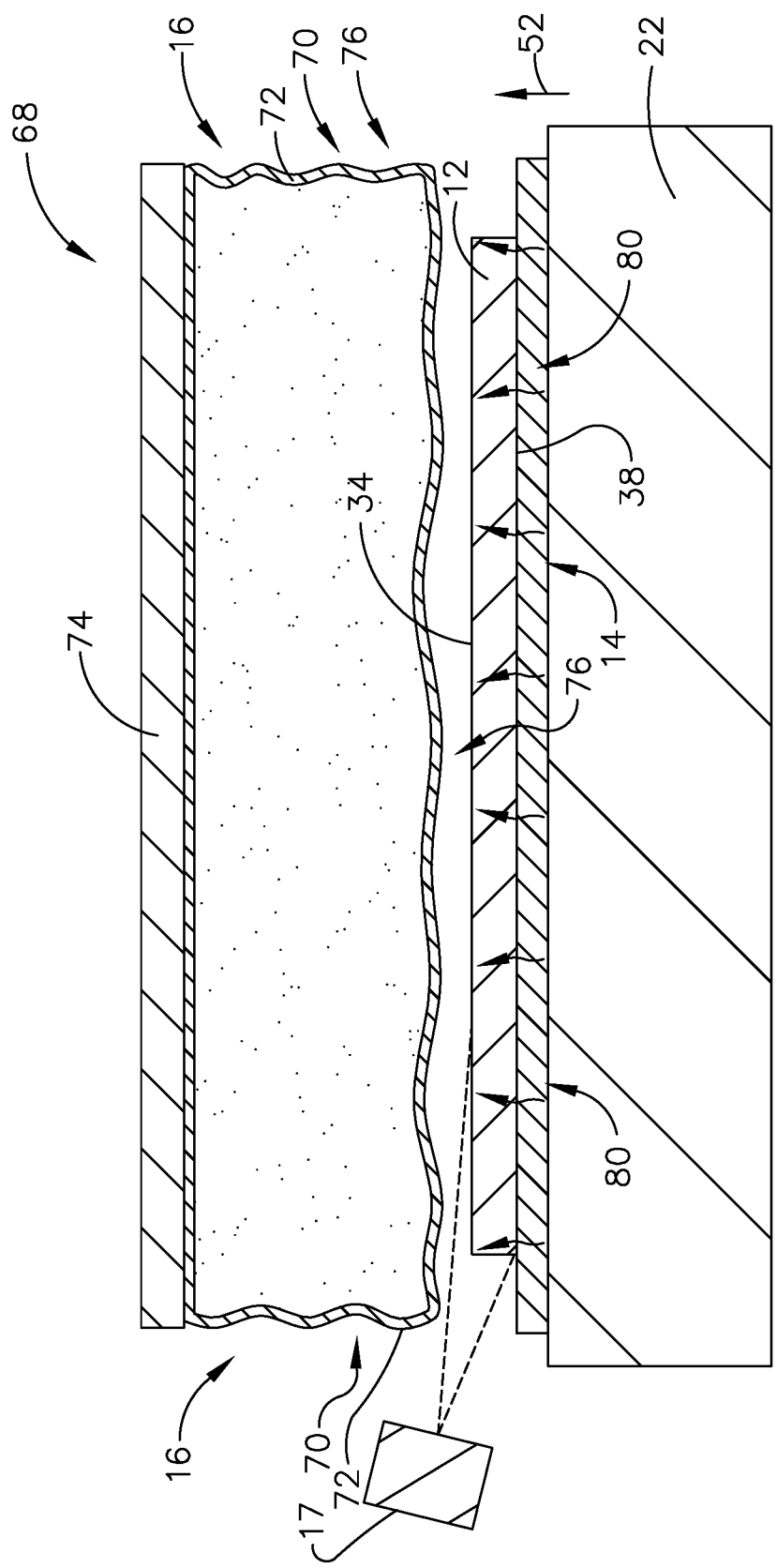
FIG. 8 is a cross section side elevation view along line 2-2 of FIG. 1 of a fifth example of a debulking assembly utilizing a third example of the force application element being partially inflated and with a third example of a heat source positioned on the forming tool for directionally heating the stack of plies through a bottom ply.
Figure 9:
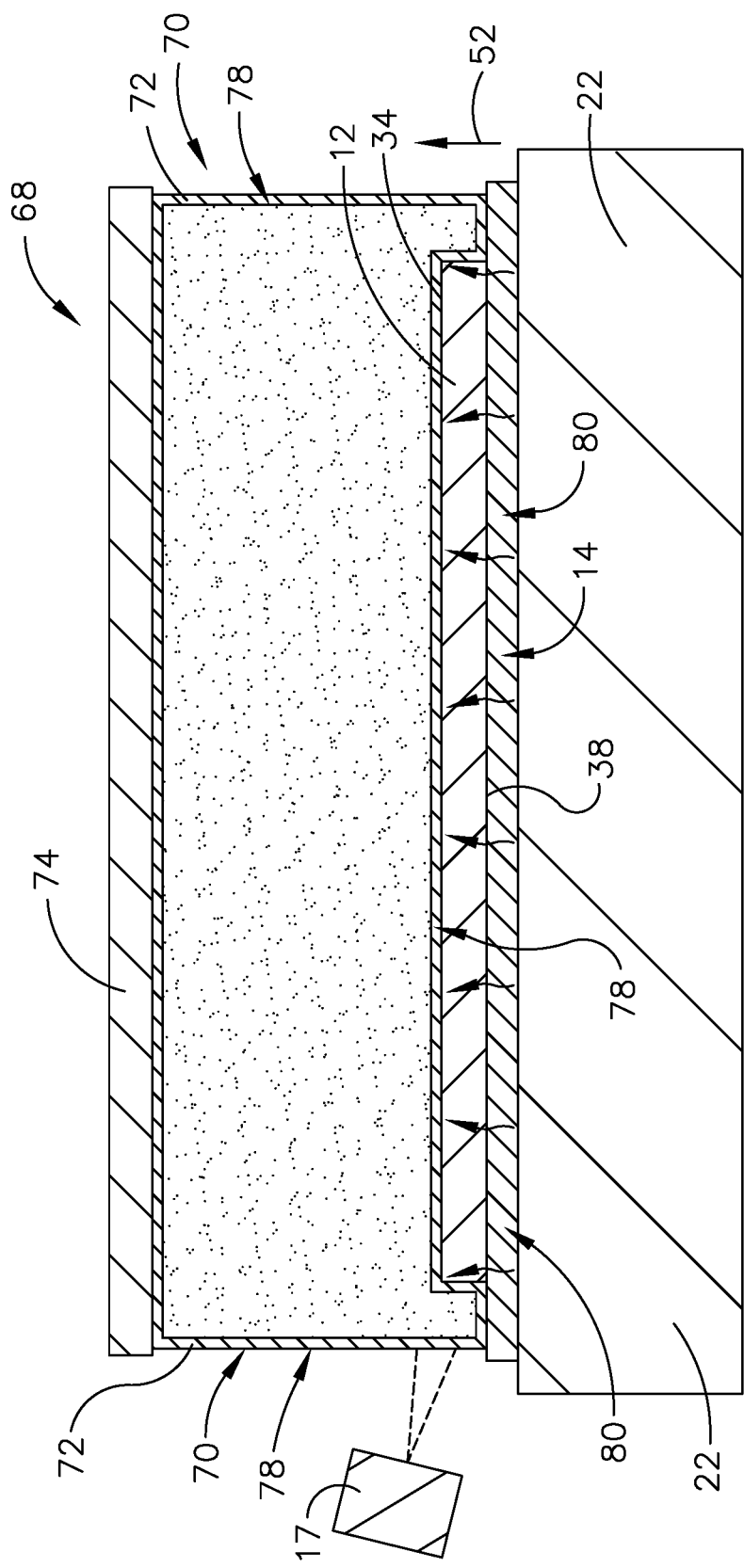
FIG. 9 is the view of FIG. 8 of the fifth example of the debulking assembly with the third example of the force application element being fully inflated.

In referring to FIGS. 8 and 9, fifth example 68 of assembly 10 for debulking is shown in operation with third example 70 of force application element 16 being inflatable bladder 72 positioned at a predetermined location relative to the uncured stack of plies of fiber reinforced composite material 12. In this example, inflatable bladder 72 is secured to cross beam 74, which for this example would be secured on either end of cross beam 74 to support frame 18. The predetermined location of inflatable bladder 72 is determined by the operator as a distance wherein inflatable bladder 72 is positioned from uncured stack of plies of fiber reinforced composite material 12 such that with inflatable bladder 72 in a non-fully inflated first state 76 as seen in FIG. 8, inflatable bladder 72 in first state 76 is not in operation for applying a compaction and consolidation force onto uncured stack of plies of fiber reinforced composite material. With inflatable bladder 72 being pressurized and placed into a fully inflated second state 78, as seen in FIG. 9, inflatable bladder 72 in second state 78 can apply a desired force against uncured stack of plies of fiber reinforced composite material 12. The compaction and consolidation force applied with inflatable bladder 72 placed in the inflated second state 78 is provided with respect to a distance in which inflatable bladder 72 is positioned from uncured stack of plies of fiber reinforced composite material 12 and the gas pressure used to inflate inflatable bladder 72. The force application with inflatable bladder 72 is further provided in this example with force element (not shown) as described earlier. Force element (not shown), as described earlier, is associated with support frame 18 being mounted to second support frame 20 such that support frame 18 can be moved along second support frame 20, such as for example with a spring or hydraulic element (not shown) positioned within second support frame 20 so as to exert a desired force onto support frame 18. In this example, support frame 18 would in turn exert the desired force onto cross beam 74 and onto third example 70 of force application element 16 being inflatable bladder 72. The force applied by inflatable bladder 72 onto uncured stack of plies of fiber reinforced composite material 12 removes voids and/or air or gas pockets from between the plies to avoid wrinkling of fibers with curing of uncured stack of plies of fiber reinforced composite material 12.

Inflatable bladder 72 can be constructed of one of many different materials such as nylon, Mylar, silicon rubber and the like, which will be a flexible material to reduce in volume when deflated and increase in volume when inflated. The flexible material will permit inflatable bladder 72 to have conforming capability to uncured stack of plies of fiber reinforced composite material 12 such that inflatable bladder 72 in second state 78 can exert a compaction and consolidating force across the uncured stack of plies of fiber reinforced composite material 12 in the presence of changing contours of the uncured stack of plies of fiber reinforced composite material 12.

In fifth example 68 of assembly 10 for debulking, heat source 14 is positioned between the uncured stack of plies of fiber reinforced composite material 12 and forming tool 22 so as to directionally heat uncured stack of plies of fiber reinforced composite material 12 in direction 52 from bottom ply 38 through top ply 34 of uncured stack of plies of fiber reinforced composite material 12. Third example 80 of heat source 14 includes a heating element such as a heating pad positioned on forming tool 22. Heat sensor 17 is employed to sense the temperature of uncured stack of plies of fiber reinforced composite material 12 as described earlier.

In referring to FIG. 10 method 82 for debulking an uncured stack of plies of fiber reinforced composite material 12 includes step 84 which includes heating uncured stack of plies of fiber reinforced composite material 12, positioned on a forming tool 22, with heat source 14, wherein heat source 14 is positioned in at least one of a following described position. Heat source 14 is positioned spaced apart from top ply 34 of uncured stack of plies of fiber reinforced composite material 12 to directionally heat uncured stack of plies of fiber reinforced composite material 12 from top ply 34, in direction 36 toward forming tool 22 through bottom ply 38 of uncured stack of plies of fiber reinforced composite material 12. Heat source 14 is positioned, with forming tool 22 positioned between heat source 14 and uncured stack of plies of fiber reinforced composite material 12, wherein heat source 14 heats forming tool 22, which directionally heats uncured stack of plies from the bottom ply 38 through top ply 34 of uncured stack of plies of fiber reinforced composite material 12. Heat source 14 is positioned between uncured stack of plies of fiber reinforced composite material 12 and forming tool 22, to directionally heat uncured stack of plies of fiber reinforced composite material 12 in direction 52 from bottom ply 38 through top ply 34 of the uncured stack of plies of fiber reinforced composite material 12. Method 82 further includes step 86 of applying a force with force application element 16, associated with the heat source 14, onto uncured stack of plies of fiber reinforced composite material 12 positioned on forming tool 22.

Method 82 further includes force application element 16 including roller 30 which defines longitudinal axis 40. Roller 30 is as earlier described, is first example 25 of force application element 16. Roller 30 defines at least two openings 42 which extend along longitudinal axis 40 of roller 30. At least two openings 42 are positioned between longitudinal axis 40 and surface 44 of roller 30 with at least two openings 42 positioned spaced apart from one another about longitudinal axis 40. This construction of roller 30 is discussed in more detail above and facilitates, along with the material used to construct roller 30, roller 30 being able to uncured stack of plies of fiber reinforced composite material 12 and provide optimal compaction and consolidation force across uncured stack of plies of fiber reinforced composite material 12 in removing voids and/or air or gas pockets from between the plies. In addition, shaft 46 is secured to roller 30 with shaft 46 extending along longitudinal axis 40 of roller 30. Shaft 46 is mounted to rotate relative to support frame 18 with a force element (not shown) exerting a force onto support frame 18 and shaft 46 as earlier described.

Force application element 16 can further include a second example 56 of force application element 16 as earlier described which includes rotatable bladder 58. Rotatable bladder 58 further includes roller member 60 which extends through rotatable bladder 58 and is secured to rotatable bladder 58. Rotatable bladder 58 further includes shaft 62 which is secured to roller member 60 wherein shaft 62 extends along longitudinal axis 64 of roller member 60. Shaft 62 is configured to rotate relative to support frame 18 with a force element (not shown) exerting a force onto support frame 18 and shaft 62 as earlier described.

Force application element 16 can further include a third example 70 of force application element 16 as earlier described which includes inflatable bladder 72 positioned at a predetermined location relative to uncured stack of plies of fiber reinforced composite material 12. The predetermined location is selected by the operator, as described above, so as to achieve the needed force to be imparted onto uncured stack of plies of fiber reinforced composite material 12 with inflating of inflatable bladder 72 and with use of earlier described force element (not shown). Inflatable bladder 72 includes one of a non-fully inflated first state 76 wherein inflatable bladder 72 is not pressurized and as such is not operational to apply a compaction and consolidation force onto uncured stack of plies of fiber reinforced composite material 12 or a fully inflated second state 78, wherein with inflatable bladder 72 is positioned in the predetermined location relative to uncured stack of plies of fiber reinforced composite material 12, second state 78 of inflatable bladder 72 includes pressurizing inflatable bladder 72 to be fully inflated. In the fully inflated second state 78 inflatable bladder 72 along with force element (not shown), as described earlier, applies compaction and consolidation force onto uncured stack of plies of fiber reinforced composite material 12 for removal of voids and/or air or gas pockets from between plies within uncured stack of plies of fiber reinforced composite material 12.

Method 82 further includes utilizing heat sensor 17, as described earlier, is positioned to sense heat from uncured stack of plies of fiber reinforced composite material 12 positioned on the forming tool 22 and heated by heat source 14. The operation of assembly 10 can be optimized with knowing the temperature of uncured stack of plies of fiber reinforced composite material so as to place heat source 14 at an operational level to attain a desired temperature of uncured stack of plies of fiber reinforced composite material 12. At a desired temperature of uncured stack of plies of fiber reinforced composite material, the viscosity of the resin within uncured stack of plies of fiber reinforced composite material 12 to facilitate and optimize removal of voids and/or air or gas pockets from between plies with the application of a compaction and consolidating force placed onto uncured stack of plies of fiber reinforced composite material 12.

While various examples have been described above, this disclosure is not intended to be limited thereto. Variations can be made to the disclosed examples that are still within the scope of the appended claims.

What is claimed:

1. An assembly for debulking an uncured stack of plies of fiber reinforced composite material, comprising:
   a force application element for application of force onto the uncured stack of plies of fiber reinforced composite material positioned on a forming tool; and
   a heat source, associated with the force application element, wherein the heat source is positioned, in at least one of a following position:
      spaced apart from a top ply of the uncured stack of plies of fiber reinforced composite material to directionally heat the uncured stack of plies of fiber reinforced composite material from the top ply, in a direction toward the forming tool, through a bottom ply of the uncured stack of plies of fiber reinforced composite material;
      with the forming tool positioned between the heat source and the uncured stack of plies of fiber reinforced composite material, such that the heat source provides heat to the forming tool to directionally heat the uncured stack of plies of fiber reinforced composite material in a direction from the bottom ply through the top ply of the uncured stack of plies of fiber reinforced composite material, wherein the heat source comprises one or more of a vessel positioned within the forming tool which contains a heated liquid, a vessel positioned within the forming tool which contains a heated gas, or a heating element secured to the forming tool; or
      between the uncured stack of plies of fiber reinforced composite material and the forming tool to directionally heat the uncured stack of plies of fiber reinforced composite material in the direction from the bottom ply through the top ply of the uncured stack of plies of fiber reinforced composite material.

2. The assembly of claim 1, wherein the force application element includes a roller having a longitudinal axis.

3. The assembly of claim 2, wherein the roller defines at least two openings, which extend along the longitudinal axis of the roller.

4. The assembly of claim 3, wherein the at least two openings are positioned between the longitudinal axis and a surface of the roller and are positioned spaced apart from one another about the longitudinal axis.

5. The assembly of claim 2, further comprising a shaft secured to the roller wherein the shaft extends along the longitudinal axis of the roller.

6. The assembly of claim 1, wherein the force application element includes a rotatable bladder.

7. The assembly of claim 6, further comprising a roller member which extends through the rotatable bladder and is secured to the rotatable bladder.

8. The assembly of claim 7, further comprising a shaft which is secured to the roller member wherein the shaft extends along a longitudinal axis of the roller member.

9. The assembly of claim 1, wherein the force application element includes an inflatable bladder positioned at a predetermined location relative to the uncured stack of plies of fiber reinforced composite material.

10. The assembly of claim 9, wherein the inflatable bladder comprising the inflatable bladder in a first, non-fully inflated, state.

11. The assembly of claim 9, wherein, with the inflatable bladder positioned at the predetermined location relative to the uncured stack of plies of fiber reinforced composite material, the inflatable bladder comprises a second, fully inflated, state.

12. The assembly of claim 1, wherein the heat source spaced apart from the top ply of the uncured stack of plies of fiber reinforced composite material to directionally heat the uncured stack of plies of fiber reinforced composite material from the top ply, in the direction toward the forming tool, through the bottom ply of the uncured stack of plies of fiber reinforced composite material comprises a radiant heat source associated with the force application element, wherein the radiant heat source is spaced apart from the force application element.

13. The assembly of claim 1, wherein the heat source, positioned between the uncured stack of plies of fiber reinforced composite material and the forming tool to directionally heat the uncured stack of plies of fiber reinforced composite material in the direction from the bottom ply through the top ply of the uncured stack of plies of fiber reinforced composite material, comprises a heating element.

14. The assembly of claim 1, further comprising a heat sensor positioned to sense heat from the uncured stack of plies of fiber reinforced composite material positioned on the forming tool and heated by the heat source.

15. A method for debulking an uncured stack of plies of fiber reinforced composite material, comprising the steps of:
   heating the uncured stack of plies of fiber reinforced composite material, positioned on a forming tool, with a heat source, wherein the heat source is positioned in at least one of a following position:
      spaced apart from a top ply of the uncured stack of plies of fiber reinforced composite material to directionally heat the uncured stack of plies of fiber reinforced composite material from the top ply, in a direction toward the forming tool, through a bottom ply of the uncured stack of plies of fiber reinforced composite material;
      with the forming tool positioned between the heat source and the uncured stack of plies of fiber reinforced composite material, such that the heat source provides heat to the forming tool to directionally heat the uncured stack of plies of fiber reinforced composite material in a direction from the bottom ply through the top ply of the uncured stack of plies of fiber reinforced composite material, wherein the heat source comprises one or more of a vessel positioned within the forming tool which contains a heated liquid, a vessel positioned within the forming tool which contains a heated gas, or a heating element secured to the forming tool; or
      between the uncured stack of plies of fiber reinforced composite material and the forming tool to directionally heat the uncured stack of plies of fiber reinforced composite material in the direction from the bottom ply through the top ply of the uncured stack of plies of fiber reinforced composite material; and
   applying a force with a force application element, associated with the heat source, onto the uncured stack of plies of fiber reinforced composite material positioned on the forming tool.

16. The method of claim 15, wherein:
   the force application element includes a roller which defines a longitudinal axis;
   the roller defines at least two openings which extend along the longitudinal axis of the roller;
   the at least two openings are positioned between the longitudinal axis and a surface of the roller with the at least two openings positioned spaced apart from one another about the longitudinal axis;

further comprising a shaft secured to the roller with the shaft extending along the longitudinal axis of the roller; and the shaft being configured to rotate relative to a support frame with a force element exerting a force onto the support frame and the shaft.

17. The method of claim 15, wherein:

the force application element comprises a rotatable bladder;

the rotatable bladder further comprising a roller member to extend through the rotatable bladder and being secured to the rotatable bladder;

the rotatable bladder further comprising a shaft secured to the roller member, the shaft to extend along a longitudinal axis of the roller member; and the shaft being configured to rotate relative to a support frame with a force element exerting a force onto the support frame and the shaft.

18. The method of claim 15, wherein:

the force application element comprises an inflatable bladder positioned at a predetermined location relative to the uncured stack of plies of fiber reinforced composite material; and the inflatable bladder comprises one of a first, non-fully inflated, state and a second, fully inflated, state.

19. The method of claim 15, further comprising a heat sensor positioned to sense heat from the uncured stack of plies of fiber reinforced composite material positioned on the forming tool and heated by the heat source.

20. The assembly of claim 14, wherein the heat sensor is spaced apart from the uncured stack of plies of fiber reinforced composite material.

\* \* \* \* \*